United States Patent [19]

Kramer et al.

[11] 4,113,887
[45] Sep. 12, 1978

[54] ADSORPTION PROCESS

[75] Inventors: Franklin Kramer, Briarcliff Manor; Yair Steve Henig, Pearl River; Torunn Atteraas Garin, Bronxville; Gerald James Vogel, Ossining, all of N.Y.

[73] Assignee: General Foods Corporation, White Plains, N.Y.

[21] Appl. No.: 771,485

[22] Filed: Feb. 24, 1977

[51] Int. Cl.$^2$ .......................... A23F 1/10; B01D 15/06
[52] U.S. Cl. ........................................ 426/422; 210/34; 210/40
[58] Field of Search ................... 210/24, 30 R, 32, 33, 210/34, 40; 426/271, 386, 387, 422, 427, 428

[56] References Cited

U.S. PATENT DOCUMENTS

| | | | |
|---|---|---|---|
| 3,448,043 | 6/1969 | Vajna | 210/34 |
| 3,979,287 | 9/1976 | Vulliez-Sermet et al. | 210/40 |
| 4,031,251 | 6/1977 | Margolis et al. | 210/40 |

Primary Examiner—Charles N. Hart
Assistant Examiner—Ivars Cintins
Attorney, Agent, or Firm—Thomas R. Savoie; Daniel J. Donovan

[57] ABSTRACT

The selectivity of an adsorbent for the preferentially adsorbed component of a multi-component solution is improved by means of a countercurrent adsorption process coupled with a reflux operation wherein the loaded adsorption medium which is taken off stream as spent adsorbent is processed to concentrate the preferentially adsorbed component therein.

11 Claims, 1 Drawing Figure

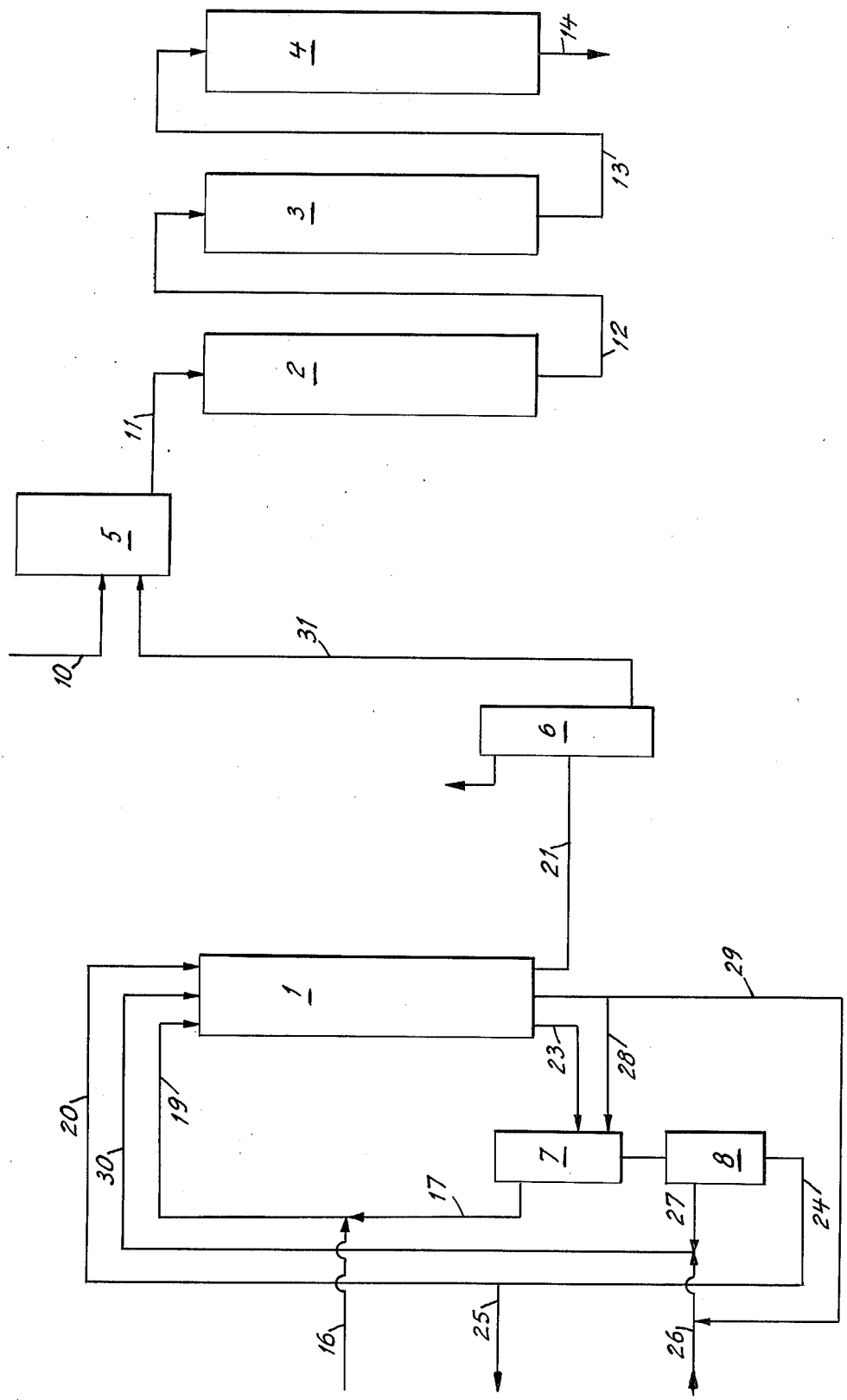

ADSORPTION PROCESS

BACKGROUND OF THE INVENTION

The use of a hydrophobic adsorption medium for removing a dissolved compound from an aqueous solution is a well-known and relatively straight-forward process when a two-component mixture is being separated. Adsorption processes intended to selectively remove one component from a multi-component system could also be relatively uncomplicated if the adsorption medium were exclusively selective for one of the components. Unfortunately, this is seldom if ever the case and, if it is desired to remove, in relatively concentrated form, a single compound from a complex mixture of chemical compounds in aqueous solution, such as aqueous food extracts or industrial waste streams, various new processing schemes must be developed and employed.

It has been found that when aqueous coffee extracts are contacted with presently available high surface area adsorption mediums capable of adsorbing caffeine numerous other compounds, most notably chlorogenic acid, are also adsorbed by the adsorbent such that caffeine constitutes only a minor amount of the total solids adsorbed. Such a process would be economically unattractive unless a technique were developed for recovering and adding-back a significant portion of the non-caffeine solids which would be lost if only classical adsorption procedures were employed.

SUMMARY OF THE INVENTION

This invention is directed to an improvement in a countercurrent adsorption process wherein a multi-component aqueous solution is essentially freed of one component while the loss of other components is minimized. Specifically this invention is suitable for decaffeinating aqueous extracts of green or roasted coffee while minimizing the loss of noncaffeine solids. Although this invention will be described in terms of decaffeinating an aqueous coffee extract in a multi-stage, fixed bed adsorption system, it will be apparent that those skilled in the art that the process steps set out herein will be applicable to a wide variety of treatments and systems, including continuous countercurrent systems, wherein it is desired to remove, in relatively concentrated form, a selected compound from multi-component solutions by means of a hydrophobic adsorption medium.

The adsorbent can be any material effective to adsorb dissolved components from an aqueous stream, such as industrial effluent or process streams, including streams containing edible and/or biologically active or therapeutic materials. Suitable adsorbents include the macroreticular acrylic and/or styrene and/or divinylbenzene adsorption resins. The resins may be ion exchange resins or they may be devoid of ion exchange functionality. However, it should be understood that this invention applies only to adsorption processes and therefore to the use of ion exchange resins as adsorbents and not solely as ion exchangers.

DESCRIPTION OF THE INVENTION

Adsorbents which are useful for removing caffeine from aqueous coffee extracts (typically 15 to 30% soluble solids), such as the caffeine-laden water extract of green coffee described in U.S. Pat. No. 2,309,092 to Berry et al., hereby incorporated by reference, are the known and commercially available non-ionogenic, macroreticular resins. Particularly useful are the high-surface area, waterinsoluble, cross-linked and granular polymers prepared by suspension polymerization of ethylenically unsaturated molecules comprising about 2 to 100, preferably at least 50, weight percent of at least one poly(vinyl) benzene monomer selected from the group consisting of divinylbenzene, trivinylbenzene, alkyl-divinylbenzenes having from 1 to 4 alkyl groups of 1 to 2 carbon atoms substituted in the benzene nucleus, and alkyltrivinylbenzenes having from 1 to 3 alkyl groups of 1 to 2 carbon atoms substituted in the benzene nucleus, which polymer has a porosity of at least 10%, a surface area of at least 10 square meters per gram, and which polymer is not appreciably swollen by caffeine. Besides the homopolymers and copolymers of these poly(vinyl) benzene monomers one or more of them may be copolymerized with up to 98% (by weight of the total monomer mixture) of (1) monoethylenically unsaturated monomer, or (2) polyethylenically unsaturated monomers other than the poly(vinyl) benzenes just defined or (3) a mixture of (1) and (2). Divinylbenzene polymers and styrene/divinylbenzene copolymers have proven particularly useful in the process of this invention.

Adsorbent resins of the aforementioned-type are known and commercially available and more fully described in U.S. Pat. No. 3,531,463 to Gustafson (Rohm & Haas Company) which is hereby incorporated by reference. Other high surface area hydrophobic adsorbents such as molecular sieves may also be useful in the process of this invention. Suitable adsorbents will be those which exhibit a dipole moment of less than about 2.0, preferably less than 0.5, debye.

The process of this invention will be described having reference to the drawing which depicts a three stage countercurrent (stages 2 to 4) adsorption train operating at steady-state conditions.

In a countercurrent, multi-stage adsorption process a plurality of columns are connected in series. Each column or stage contains a fixed bed of the adsorbent and the coffee extract to be treated is passed in succession through the plurality of beds which are used stepwise in countercurrent relation to the flow of liquid, such that the caffeine-containing coffee extract enters the system (line 10), is passed through the most spent adsorption bed (stage 2) and exits (line 14) the system through the freshest or least spent adsorption bed (stage 4). Typically the coffee extract is continuously fed to the most loaded (most spent) stage (2) until the capacity of the bed for adsorption of caffeine from the extract stream is approached or reached, that is until the caffeine concentration of the coffee extract exiting (line 12) this column is at or approaches the caffeine concentration of the extract entering (line 11) the column. It would, of course, be possible to stop the feed of extract to stage 2 at any point prior to saturation. When the desired amount of caffeine has been adsorbed onto the stage 2 resin bed, the extract feed is switched to the next most spent but yet not fully loaded adsorption bed and a fresh adsorption bed (not shown) is added onto the downstream end of the system.

The loaded bed or column positioned at stage 2, which in conventional countercurrent adsorption processes would be immediately and completely regenerated with all of the adsorbed solids passing out of the system with a desorbent or elution medium, is, according to this invention, held for a recovery operation before regeneration is accomplished.

It would of course be possible to feed the loaded bed of stage 2 with an amount of water sufficient to displace any extract contained in the column, and an additional amount of water sufficient to wash the adsorbent bed of entrapped but non-adsorbed solids may also be employed. The displaced extract and aqueous wash solution could then be fed into the adsorption column train together with fresh feed extract. This addition of water is, however, usually not desired since it introduces an amount of water into the decaffeination system which will usually have to be removed at a later point by such energy intensive steps as evaporation.

Preferably the loaded bed or column will, immediately upon being removed from the adsorption column train, be positioned at stage 1 and will be fed through line 20 with an aqueous solution containing adsorbed solids recovered or eluted in prior regeneration cycles, as will be more fully described below. Of course in the initial cycle stream 20 will have to be made up and injected into the process system; however once steady state is achieved, no make-up need be required.

It has been found that when operating a countercurrent adsorption system according to the techniques of this invention additional adsorption bed capacity can be obtained in the loaded column; and that surprisingly this additional capacity is available to adsorb solids according to a different and more desirable distribution pattern than was obtained during contact between the adsorption bed and feed stream. Although it is not desired to be limited to any particular theory, it appears that as stream 20 is fed through stage 1 most, if not all, of the previously adsorbed non-caffeine solids of stream 20 will pass through the resin bed (exiting via line 21) without being readsorbed, while most of the previously adsorbed caffeine solids will be readsorbed onto the resin bed. It is also possible that some of the non-caffeine solids adsorbed onto the stage 1 resin bed during its passage through the countercurrent adsorption system (stages 4 to 2) will be displaced from the resin by caffeine solids adsorbed from stream 20. As a result, the adsorption bed of stage 1 will contain a new and more preferred distribution of adsorbed solids which distribution will contain a higher percent (weight basis) of caffeine and consequently a lower percent of non-caffeine solids than found in the loaded adsorption bed of stage 2.

The desirability of a low weight percent of non-caffeine solids in the adsorption bed which is to be regenerated is based on the fact that these non-caffeine solids are not easily and/or economically separated from caffeine in a manner which will allow these non-caffeine solids to be reintroduced into the decaffeination system. Chemical treatments which are able to fractionate these adsorbed solids either during or after elution or desorption will so alter and/or degrade the non-caffeine solids that governmental regulations would not permit their reintroduction to the decaffeination system. As a consequence, the non-caffeine solids which are present on the adsorption bed prior to elution will be removed from the decaffeination system and constitute an economic loss as well as waste disposal problem.

As will be apparent to those skilled in the art, stream 20 will contain a higher weight percent of caffeine (solids basis) and a lower weight percent of non-caffeine solids than that present in the feed (line 11) to stage 2. The solids concentration of stream 20 will be adjusted such as by evaporator 8, so that the caffeine concentration (based on weight of solution) is higher and the total solids concentration is lower than the respective concentrations of stream 11. Under these critical conditions, during contact between stream 20 and the stage 1 adsorbent bed, there appears to be a significant positive driving force for adsorbing additional caffeine onto the bed, but only a small or possibly even a negative driving force, for adsorbing additional non-caffeine solids onto the bed. This finding is surprising since, although the total non-caffeine solids concentration in stream 20 is lower than that of stream 11, all of the non-caffeine solids of stream 20 are capable of being adsorbed. One would expect that the concentration of some of the multitude of previously adsorbed non-caffeine solids would be higher in stream 20 than in stream 11 and that the net result would be a relatively constant percent (solids basis) of non-caffeine solids being on the stage 1 resin bed.

Another surprising aspect of the process of this invention as it specifically relates to the decaffeination of coffee extracts is that caffeine is known to complex with certain of the non-caffeine solids, most notably chlorogenic acid, present in both stream 10 and stream 20. The fact that these caffeine-complexing solids appear to be able to pass through caffeine-loaded adsorbent bed of stage 1 without complexing with the adsorbed caffeine could not be predicted.

Stream 21 which exits the bottom of stage 1, during the time stream 20 feeds the top of this column, contains the non-caffeine solids which would be lost in conventional adsorption processes together with a minor amount of caffeine. The amount of solution fed back to the adsorbtion train (via lines 21 and 31) will be, as discussed below, controlled so as to limit the total amount of caffeine introduced into the adsorption train (stages 2 to 4).

After flow from line 20 has ceased, recovery stage 1 may, especially if not previously done, be washed with water in a sufficient amount to displace any solution present in the column as well as to wash the adsorption bed of entrapped solids. However, again it will usually be preferable to avoid addition of water to the system and the consequent dilution of process streams 21 and/or 23.

The stage 1 adsorption bed will be regenerated by means of a suitable desorbent (line 19) which may consist of recycled desorbent (line 17) and fresh make-up desorbent (line 16). Typically regeneration will be accomplished by an organic solvent which is easily separable from water by such means as distillation, or an aqueous solution of such a solvent such as an aqueous alcohol solution.

It will next be desirable, especially in food processing applications, to remove all of the desorbent from the adsorbent bed. It would be possible to steam the resin in order to remove all or a portion of the desorbent, preferably however the desorbent will be displaced by means of one or more water rinses (line 30), at least one of which will preferably be in the reverse direction (not shown). Fresh displacement water may be fed to the system (line 26) and combined with other available water streams, such as the evaporative condensate (line 27) of evaporator 8 and recycled displacement water (line 29).

It will generally be desirable to pass the initial portion of displacement water which exits from the column to fractionator 7 (via line 28) where any solvent contained therein can be recovered for recycle. Following amounts of displacement water, generally about the latter half, which may contain only an extremely low level of solvent, can be recycled (line 29) without treatment to constitute the initial portion of displacement water for the displacement step in a subsequent cycle.

The eluant (line 23), which will contain a higher level (typically about 35 to 65%) of caffeine, based on the total weight of soluble solids than would be obtained by eluting the loaded resin bed of stage 2 immediately after it is removed as the spent stage from the countercurrent adsorption train, is processed, such as in fractionater 7, to remove organic solvent from an aqueous solution of solids. The essentially solvent free solids solution is then, through appropriate concentration (evaporator 8) or dilution steps, used to produce an aqueous solution (line 24) having a higher caffeine concentration then was present in the feed (line 11) to the adsorption column train. A portion of this high-caffeine solution (line 25) is removed from the system as a by-product stream and the remainder of the solution (line 20) is used to concentrate caffeine on the next loaded column removed from the adsorption train. As an alternative to merely separating a portion of stream 24 as a caffeine rich by-product, it may be possible to subject all or a portion of stream 24 to a fractionation process (not shown), such as fractional crystallization, membrane separation, fractional sublimation, electrodialysis, and the like to obtain a by-product stream which has an even greater caffeine level and to feed the resulting stream (e.g., the mother liquor, etc.) to line 20.

It has been found that the process of this invention is most effective when the caffeine concentration of the high caffeine stream (stream 20) which is fed to the loaded bed of stage 1 is at least two times, preferably at least about four times greater than the caffeine concentration of feed stream 11. The addition of relatively pure caffeine material to stream 20 in order to effect this high caffeine concentration is specifically contemplated by this invention. Preferably the total solids concentration of stream 20 (typically about 6 to 15% by weight) will be less than, usually about one-half or less, that of stream 11. Further is has been found that the amount of caffeine returned (via lines 21 and 31) to the adsorption train from the recovery stage (1) should not greatly exceed the amount of caffeine present in the feed extract (line 10). Preferably the weight ratio of caffeine fed to stage (2) via line 10 to the amount of caffeine fed via line 31, herein defined as the reflux ratio is from 0.01:1 to 5:1, preferably from 0.1:1 to 2.5:1 and typically is about 0.5:1 to 1.5:1.

As will be recognized by those skilled in the art, numerous holding tanks, valves and similar standard equipment, although not shown, may be provided as dictated by standard chemical process design techniques.

A preferred embodiment of the invention is described in the following Example, all percentages being in terms of weight percent and the Example describing a system as shown in the Figure, operating in a countercurrent mode at equilibrium conditions. The various stream referred to in the Example have the parameters set forth in Table I.

TABLE I

| STREAM NO. | 10 | 11 | 14 | 20 | 31 | 24 | 25 |
|---|---|---|---|---|---|---|---|
| Total Solids (gms) | 605.8 | 637.1 | 587.7 | 116.7 | 56.8 | 134.75 | 18.05 |
| Caffeine (gms) | 6.68 | 14.28 | 0 | 43.1 | 7.6 | 49.78 | 6.68 |
| Non-Caffeine Solids (gms) | 599.1 | 622.8 | 587.7 | 73.6 | 47.0 | 84.97 | 11.37 |
| Solution (gms) | 2578 | 2830 | | 1080 | 252 | 1333 | 253 |
| Solids Conc. (%) | 23.2 | 23.2 | | 10.8 | 23.2 | 10.8 | 10.8 |
| Caffeine Conc. (%) | 0.26 | 0.51 | | 3.99 | 3.0 | 3.99 | 3.99 |
| Caffeine Conc. Dry Basis (%) | 1.1 | 2.24 | | 36.9 | 13.3 | 36.9 | 36.9 |

EXAMPLE 1

Each stage of the adsorption system contains 480 grams of hydrated non-ionogenic, macroreticular adsorption resin of the polydivinylvenzene type (Amberlite XAD-4 of Rohm & Haas Company), providing a bed volume of 540 cc. which bed contains a void volume of about 50%. Stream 10 (at 4.34 bed volumes) consisting of an aqueous extract of green coffee (180° F.) as described in the aforementioned Berry et al patent, was combined (tank 5) with stream 31 and fed to spent stage 2 as stream 11. Caffeine solids together with non-caffeine solids were adsorbed onto each of the resin beds 2, 3 and 4 as the coffee extract flowed through the adsorption train which is connected by means of lines 12 and 13. The extract exiting the system, stream 14, was found to be free of caffeine and lower (by 11.37 gms) in non-caffeine solids than stream 10. Stream 25 exiting the system was found to contain 37% caffeine on a dry basis and 11.37 gms. of non-caffeine solids. This stream was then processed to recover pure caffeine and the non-caffeine solids were discarded and taken as solids losses from the decaffeinated coffee.

For the next following adsorption cycle the resin bed of stage 2, which contains approximately 73 grams of adsorbed solids 23% of which are caffeine and 15.5%, of which are chlorogenic acid, is transferred to the stage 1 position while a fresh resin bed placed at the stage 4 position and the prior stage 3 and 4 beds were moved to the 2 and 3 stage position, respectively, Stage 1 is then initially fed with high-caffeine concentration (3.99%) stream 20 in the amount of about 2.0 bed volumes (1080 gms) and the resulting effluant stream 21 is concentrated in evaporator 6. This concentrated stream 31 is combined with stream 10 in tank 5 and the resulting mixture, stream 11 is fed to stage 2.

Stage 1 is next eluted with about 8.0 bed volumes of dilute (40% water) ethanol (stream 19), having a temperature of about 170° F., and the resulting eluant stream 23 is first fractionated at 7 to remove and recover aqueous ethanol and then concentrated in evaporator 8 to obtain a solids level of 10.8% in stream 24. A portion (about 19%) of stream 24 is passed to a caffeine refining step as stream 25 and the remainder (stream 20) is held for fed to stage 1 of the following cycle. Stage 1 is next fed with water (stream 30) in order to displace the alcohol contained therein and thereby ready the resin bed to reuse in the multistage adsorption train.

EXAMPLE 2

Using the three stage adsorption battery of the figure but without the use of recovery stream 20 or reflux stream 31 but rather with the immediate elution of the stage 2 columns after it is removed from the adsorption train, and positioned at stage 1, the following streams are obtained at equilibrium conditions.

TABLE 2

| STREAM NO. | 10(11) | 14 | 24(25) |
|---|---|---|---|
| Total Solids | 873.18 | 660.34 | 67.52 |
| Caffeine | 10.8 | 0 | 10.8 |
| Non-Caffeine Solids | 864.8 | 660.34 | 56.72 |
| Amount of Solution | 4158 | | 1623 |
| Solids Conc. | 21 | | 4.12 |
| Caffeine Conc. | 0.26 | | 0.67 |
| Caffeine Conc. Dry Basis | 1.18 | | 16 |

As can be seen from the above Table 2, the byproduct stream 25 (same as 24) which exits the system contains only 16% caffeine solids on a dry basis. Thus for every gram of caffeine that is removed from the system 5.25 gms. of non-caffeine solids are lost. As the amount of the lost non-caffeine solids directly affect the overall economy of the decaffeination system it is desirable to keep this loss to a minimum. A comparison of non-caffeine solids losses for Examples 1 and 2 is set out in Table 3.

TABLE 3

| Basis | Ex. 1 | Ex. 2 |
|---|---|---|
| % non-caffeine solids in by-product (non-caffeine solids in by-product/non-caffeine solids fed to system) X100 | 63% | 84% |
| | 1.9% | 6.6% |
| Amount of non-caffeine solids removed in by-product per gram of caffeine | 1.7 gms. | 5.25 gms. |

Comparable results may also be achieved when the decaffeination of aqueous extracts of roasted coffee is desired; however before the extract is contacted with the adsorbent resin it will be preferable to remove the volatiles from the extract by such means as steam stripping. The volatiles are retained and added-back to the decaffeinated coffee extract at a subsequent processing stage.

What is claimed is:

1. A countercurrent adsorption process for separating a preferentially adsorbed component from an aqueous multi-component solution which contains additional compounds which are also adsorbed comprising the steps of:
    (a) passing the multi-component solution to the most spent section of a countercurrent, multi-section adsorption system and withdrawing the solution from the least spent section of said system until a desired amount of the preferentially adsorbed component is adsorbed on the most loaded adsorbent, thereafter
    (b) passing an aqueous solution of solids through said most loaded adsorbent and obtaining effluent therefrom, said solution having a higher concentration of the preferentially adsorbed component but a lower total solids concentration than present in the multi-component solution of step (a), and said solids comprising solids desorbed during prior adsorbent regeneration steps,
    (c) adding fresh adsorbent to the least spent section of the countercurrent adsorption system,
    (d) passing an amount of the effluent of step (b) to the most spent section of the countercurrent adsorption system together with an amount of the multi-component solution, the amount of said effluent being sufficient to effect a reflux ratio for the preferentially adsorbed component of 0.01:1 to 5:1, thereafter
    (e) passing a desorbent through the adsorbent of step (b) in order to remove adsorbed solids, said solids having, on a dry basis, a relatively high level of the preferentially-adsorbed component.

2. The process of claim 1 wherein the adsorbent is comprised of non-ionogenic, macroreticular, cross-linked resin particles.

3. The process of claim 2 wherein the desorbent of step (e) is an organic solvent or aqueous solution thereof.

4. The process of claim 3 wherein the adsorbed solids of step (e) are separated from the organic solvent and a portion of these solids are fed in aqueous solution to the most loaded adsorbent of step (b).

5. The process of claim 2 wherein the adsorbent is an acrylic, styrene, divinylbenzene or combination thereof resin.

6. The process of claim 2 wherein the adsorbent resin is a divinylbenzene polymer or a styrene/divinylbenzene copolymer.

7. The process of claim 1 wherein the countercurrent adsorption system is a multi-stage, fixed-bed adsorption train.

8. The process of claim 1 wherein the solids concentration of the multi-component solution of step (a) is from 15 to 30% by weight and the solids concentration of the solution of step (b) is from 6 to 15% by weight.

9. The process of claim 8 wherein the multi-component solution is an aqueous extract of green or roasted coffee.

10. The process of claim 1 wherein the reflux ratio is from about 0.5:1 to 1.5:1.

11. The process of claim 1 wherein the multi-component solution is fed to the most spent section in step (a) until the capacity of the most loaded adsorbent for adsorption of the preferentially adsorbed component is substantially reached.

* * * * *